United States Patent [19]
Koike et al.

[11] Patent Number: 5,781,253
[45] Date of Patent: Jul. 14, 1998

[54] LIQUID CRYSTAL DISPLAY HAVING ELECTROSTATIC DISCHARGE PROTECTION AND METHOD FOR MANUFACTURING THE SAME

[75] Inventors: Tetsushi Koike, Sagamihara; Manabu Kodate, Yokohama; Mitsuru Ikezaki, Sagamihara, all of Japan

[73] Assignee: International Business Machines Corporation, Armonk, N.Y.

[21] Appl. No.: 735,906

[22] Filed: Oct. 25, 1996

[30] Foreign Application Priority Data

Oct. 31, 1995 [JP] Japan .................. 7-283180

[51] Int. Cl.$^6$ ........................................ G02F 1/136
[52] U.S. Cl. ............................... 349/40; 349/139
[58] Field of Search ........................... 349/40, 187, 42, 349/41, 43, 139; 445/24; 361/58, 91, 128, 129, 130, 212; 439/181; 257/328, 356, 546

[56] References Cited

U.S. PATENT DOCUMENTS

| 4,532,419 | 7/1985 | Takeda | 361/212 |
| 5,019,002 | 5/1991 | Holmberg | 445/24 |
| 5,220,443 | 6/1993 | Noguchi | 349/40 |
| 5,227,901 | 7/1993 | Iizuka et al. | 349/40 |
| 5,384,266 | 1/1995 | Chapman | 437/21 |

*Primary Examiner*—William L. Sikes
*Assistant Examiner*—Tai V. Duong
*Attorney, Agent, or Firm*—James E. Murray; Jay P. Sbrollini

[57] ABSTRACT

A liquid crystal display, and its manufacturing process, are provided in which antistatic measures are taken in the manufacturing process to prevent the occurrence of static failure before the formation during that process of the short ring. On a glass substrate 2, gate lines 46 are formed. The gate lines 46 are disconnected to form a discharge gap 50 with projections 52 and 54 on both sides of the gap 50. The discharge projections 52 and 54 are positioned substantially at the center of the edges of the disconnected portion of the gate lines 46. A gate insulation film 56 is formed on the gate lines 46 and in the discharge gap 50. Two through holes 58 are made in the gate insulation film 56 in the vicinity of the discharge projections 52 and 54 of each gate line 46. A metal wiring layer 48 is formed on the gate insulation film 56 so as to fill in the through holes 58 where the discharge gap is no longer necessary.

11 Claims, 3 Drawing Sheets

LIQUID CRYSTAL DISPLAY HAVING ELECTROSTATIC DISCHARGE PROTECTION AND METHOD FOR MANUFACTURING THE SAME

FIELD OF THE INVENTION

The present invention is related to a liquid crystal display and a method for manufacturing the same, and particularly to a liquid crystal display in which countermeasures against static electricity are taken in the manufacturing process thereof, and a method for manufacturing the same.

BACKGROUND OF THE INVENTION

In the active matrix liquid crystal display using Thin Film Transistors (TFTs) or the like as switching elements, a liquid crystal is sealed between oppositely disposed glass substrates, and a voltage is applied to the liquid crystal to drive it. On one of the two oppositely disposed glass substrates, a plurality of pixels is formed in a matrix. In each pixel, a transparent display electrode of Indium Tin Oxide (ITO) or the like is formed, and a switching element such as a TFT is connected to each display electrode.

The gate electrode and the drain electrode of the TFT of each pixel are respectively connected to a gate line formed in the row direction and to a data line formed in the column direction, which lines are located in the area between pixels. If the gate line is selected when gray-scale data is outputted on the data line, the gate of the TFT is turned on to enable the gray-scale data to be written from the drain region connected to the data line to the display electrode connected to the source region.

Referring to FIGS. 8 and 9, the wiring structure of a liquid crystal display is described in more detail. FIG. 8 shows part of the plane of a liquid crystal display 1 manufactured by the conventional module making process. Inside the periphery of an array substrate 2, a color filter substrate 4 is formed, and further inside the periphery of the color filter substrate 4, a sealing agent 6 is formed. The area surrounded by the sealing agent 6 is an image display area, where the data and gate lines 10 intersect at right angles to form the pixels in a matrix.

The OLB electrodes formed in the area surrounding the array substrate 2 are compression bonded by an Anisotropic Conductive Film (ACF) to the leads on one side of a plurality of TCPs 12 on which a driver IC 30 is mounted. One TCP 12 corresponds, for instance, to every 200 of wires 10 formed on the array substrate 2. The number of wires shown in the figure is reduced to simplify the drawing. A printed wiring board 32 is soldered to the other side of the TCPs 12.

The shape of the data lines or gate lines is shown in FIG. 9. The OLB electrodes 40 compression bonded by ACF to the leads on one side of the TCPs 12 have a width of, for instance, 50 to 150 µm and a length of, for instance, 3 mm, and are connected to the signal or gate lines 10 at one end thereof. The width of the data lines/gate lines 10 is 10 to 50 µm, and the length thereof is, for instance, 20 cm. The width and length of the OLB electrodes 40 and the data lines/gate lines 10 depend on the size and wiring density of the display.

For color display providing a VGA display mode, a matrix of wires 10 as shown in FIG. 8 will have 640×3=1920 wires in the row direction and 480 wires in the column direction. Due to the large number of data lines and gate lines that are combined with other elements such as TFTs to form the matrix, there is a problem of defects caused by static electricity occurring in the manufacturing process of the liquid crystal display panel.

Static electricity buildup in the manufacturing process of the display panel of TFT/LCD occurs for various reasons. For instance, a glass substrate functioning as the array substrate is fixed by vacuum suction onto a plate of the apparatus for manufacturing the liquid crystal display. A static charge referred to as the peeling charge occurs when the glass substrate is removed from the plate by deactivating the vacuum suction at the end of the process. Static electricity buildup in gate lines or data lines causes a voltage considerably larger than the actual driving voltage to be applied to TFTs or wiring intersections, producing breakdown of the insulation film or the like. As a result, the switching elements are disabled, and as a line defects are caused.

Antistatic failure measures for preventing such static failure include the formation of a protection circuit (short ring) as disclosed in the Japanese Published Unexamined Patent Application No. 63-220289. This is implemented by providing a reference potential wiring, and providing independent electrical connection between each signal wire by the use of a two-terminal operation switching element.

Referring to FIG. 10, the manufacturing process of a liquid crystal display is described in order of major process steps. The manufacturing process of a liquid crystal display comprises three such steps: an array step in which gate lines and data lines are formed on a glass substrate, and switching elements such as TFTs and display electrodes are formed; a cell step in which the formed array substrate and a color filter substrate are laminated together, and a liquid crystal is injected and sealed by a sealing agent; and a module making step in which the attaching of TAB and the soldering of a printed wiring board are finally carried out.

The short ring is formed simultaneously with the formation of the data lines in the stage in which the source/drain electrodes of TFTs and the signal wiring are formed after the gate lines, TFTs, and display electrodes are formed on the glass substrate in the array step. At this stage, the all gate lines and the all data lines are short-circuited using the material for forming the data lines, or connection is made between the reference potential wiring and the gate lines/data lines through the switching elements as described above, to prevent static failure.

Thus, it can be said that the short ring is an effective countermeasure against static failure in the cell step before subsequent cutoff of the short ring, but the short ring cannot be formed before the data lines are formed in the array step, and accordingly, there is no effective countermeasure for preventing static failure almost throughout the array step.

As the liquid crystal displays have increased in size and definition, the length of the main line of gate lines and the number of gate lines have increased, and the thickness of the interlayer insulation film has become thinner. As a result, static buildup occurs in the gate lines formed on the glass substrate before the short ring has been formed, breaking the interlayer insulation film in a pixel.

Accordingly, measures needed to be taken against static electricity in all the stages of the manufacturing process of a liquid crystal display.

Therefore, it is an object of the present invention to provide a liquid crystal display, and method of manufacture, in which static failure occurring before the formation of the short ring is prevented.

It is a further object of the present invention to provide a liquid crystal display, and method of manufacture, in which the occurrence of static failure is prevented in substantially all the stages of the manufacturing process thereof.

BRIEF DESCRIPTION OF THE INVENTION

The above objects are accomplished by an active matrix liquid crystal display in which switching elements are formed in the pixel area on a substrate, comprising: a set of first metal wires formed on the substrate are disconnected in a partial area thereof; an insulation layer formed on the first metal wires so as to fill in the partial area, and having through holes formed on the first metal wires on both sides of the partial area; and a second metal wiring formed on the insulation layer as to fill in the through holes, and electrically connected to the first metal wirings.

Further, the above objects are accomplished by a method for manufacturing an active matrix liquid crystal display in which switching elements are formed in the pixel area, comprising: forming a set of first metal wires that are disconnected in a partial area thereof on a substrate on which the switching elements are to be formed; forming an insulation layer filling in the partial area on the first metal wires; forming through holes in the insulation layer on the first metal wires on both sides of the partial area; and forming a second metal wires electrically connected to the first metal wirings on the insulation layer so as to fill in the through holes.

Thus, in accordance with the present invention, lower-layer wires, such as the gate wires formed at the initial stage in the manufacturing process of a liquid crystal display, are disconnected in a predetermined area when they are formed, to thereby cause the static electricity building up in the gate lines to be discharged in this area. Accordingly, the pixel failure due to static electricity in the step prior to the formation of the short ring can be prevented.

Moreover, in the step of forming the short ring, the disconnected gate lines can be restored to the original gate lines by connecting them to the other metal wiring layer, and the antistatic measures can be transferred to the short ring.

In addition, the partial area of the first metal wires is preferably formed at such a position that the areas of respective ones of a set of first metal wires are substantially equal, and if the partial area is not formed within the pixel area of a liquid crystal display, it can be formed outside the pixel area.

DETAILED DESCRIPTION OF THE INVENTION

The preferred embodiment of the present invention is described in connection with FIGS. 1 to 7. The wiring structure of the gate lines of the liquid crystal display according to the preferred embodiment of the present invention is described using FIGS. 1 to 3. In this embodiment, the description is made on the assumption that the liquid crystal display is a color liquid crystal display with a VGA display mode, which has a display area having a size of about 10 inches.

Figure 1:
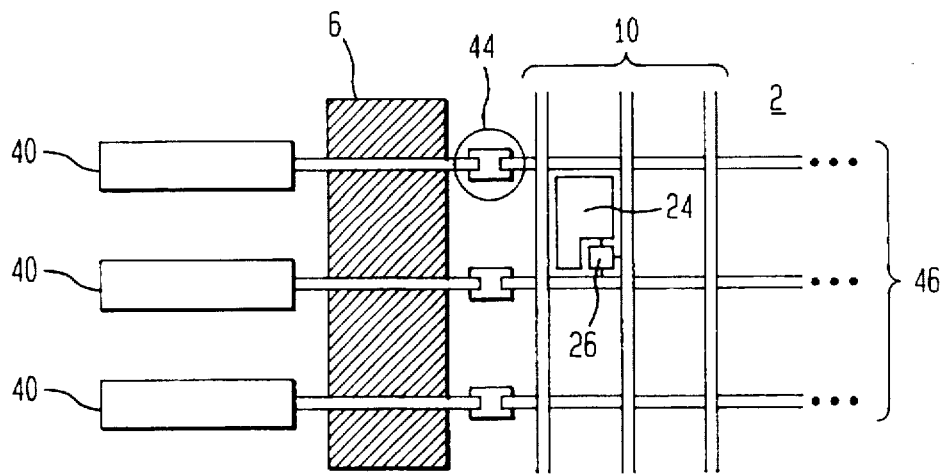
FIG. 1 shows the wiring structure of the liquid crystal display according to the embodiment of the present invention.

FIG. 1 is a partially enlarged plan view of the peripheral portion of the panel of the liquid crystal display according to the present invention. Data lines 10 and gate lines 46 formed on the array substrate 2 of the liquid crystal display extend from the display area to OLB electrode portions 40 through a sealing agent 6 sealing the liquid crystal. Areas surrounded by the gate lines 46 and the data lines 10 are pixel areas. Display electrodes 24 are formed on the array substrate in those pixel areas. In each display electrode 24, at the intersection of the gate line 46 and the data line 10, there is a TFT 26 as a switching element. Onto the array substrate 2, a color filter substrate (not shown) is laminated through the sealing agent 6. Onto the OLB electrode portions 40 on the array substrate, is bonded a TCP (not shown), for instance, by ACF.

Figure 2:
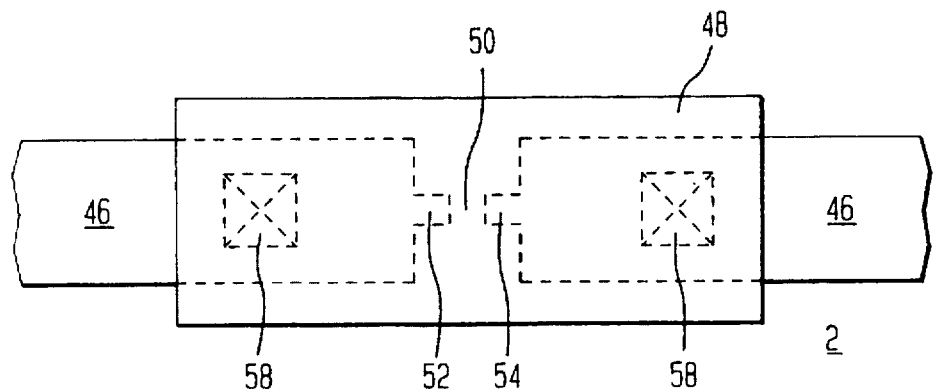
FIG. 2 is a plan view of the wiring structure of the liquid crystal display according to the embodiment of the present invention.
Figure 3:
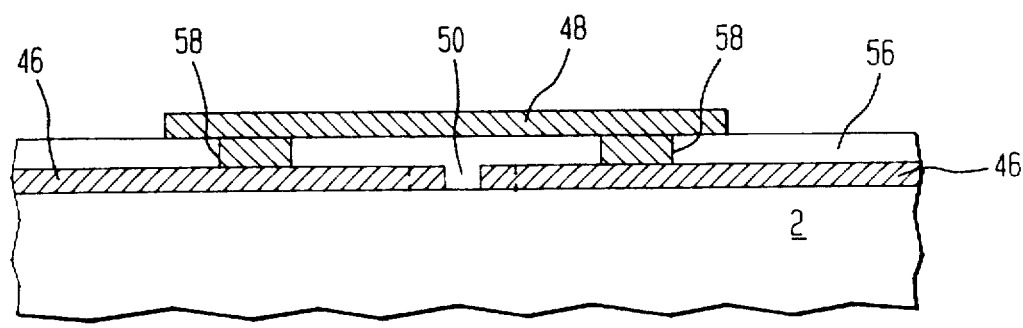
FIG. 3 is a cross-sectional view of the wiring structure of the liquid crystal display according to the embodiment of the present invention.

An enlarged plan view of the area surrounded by a circle 44 in FIG. 1 as seen from the array substrate side is shown in FIG. 2, and a cross-sectional view thereof is shown in FIG. 3. Using FIGS. 2 and 3, the characteristic features of the liquid crystal display according to the present invention are described. On a glass substrate 2, are formed gate lines 46 made of a metal film of, for instance, Mo, Ta, Cr, Al or the like, having a thickness of about 0.3 µm. For a display area of 10 inches, the width of the gate lines 46 is about 20 µm, and the pitch is about 330 µm. The length of the gate lines 46 is about 20 cm. The gate lines 46 are disconnected, and on the edges of the disconnected lines, discharge projections 52 and 54 are formed on both sides of a discharge gap 50 so as to provide a spacing of, for instance, about 6 µm, between them. The discharge gap 50 is formed at a position between the OLB electrode portion 40 and the pixel area, at a position which is about 0.5 mm apart from the pixel area toward the OLB electrode portion. The discharge projections 52 and 54 are positioned substantially at the center of the edges of the disconnected portion of the gate line 46. The height of the discharge projections 52 and 54 from the gate line edges and the width thereof are both about 6 µm.

On the gate lines 46 and between the discharge gap 50, a gate insulation film 56 of a silicon oxide film is formed to a thickness of the order of 0.4 µm. Two through holes 58 are made in the gate insulation film 56 in the vicinity of the discharge projections 52 and 54 of the respective gate lines 46. Filling in the through holes 58, is a metal wiring layer 48 of Al, having a thickness of about 0.3 µm, on the gate insulation film 56.

As described above, the liquid crystal display according to the embodiment of the present invention has a construction in which the gate lines are disconnected in part thereof, and the disconnected gate lines are electrically connected by the upper metal wiring layer via the through holes formed in the insulation film on the gate lines.

Figure 4:
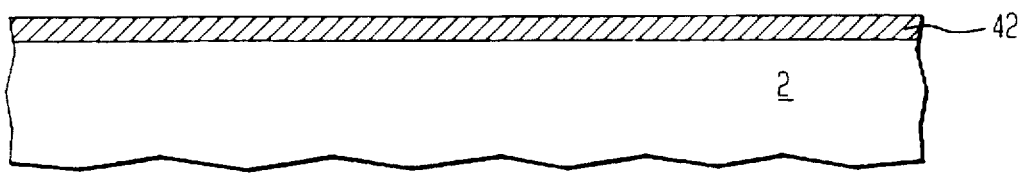
FIG. 4 shows a step in the method for manufacturing a liquid crystal display according to the embodiment of the present invention.
Figure 5:
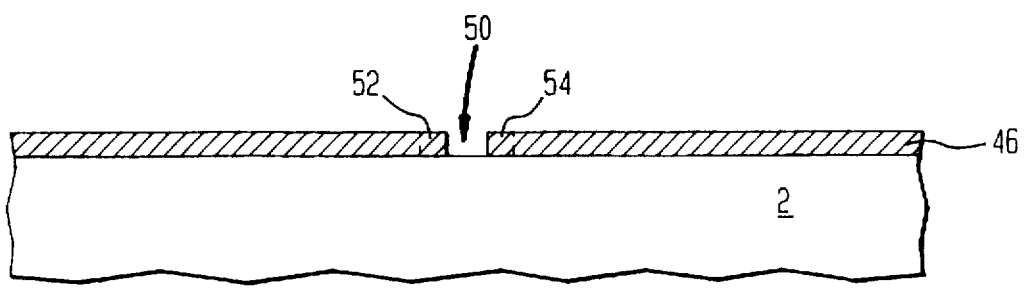
FIG. 5 shows a second step in the method for manufacturing a liquid crystal display according to the embodiment of the present invention.

The method for forming the gate lines of the liquid crystal display according to the embodiment of the present invention is now described referring to FIGS. 4 to 7. A metal film 42 of such as Mo, Ta, Cr, or Al is deposited by sputtering on the whole surface of a glass substrate 2 to a thickness of about 0.3 μm (FIG. 4). Then the metal film 42 is patterned to form the gate electrodes (not shown) and gate lines 46 of a TFT (FIG. 5). For a 10-inch display area, the width of the gate lines 46 is about 20 μm and the pitch is about 330 μm. The length of the gate lines 46 is about 20 cm.

At this point, each gate line 46 is patterned so as to be disconnected in part thereof, and a discharge gap 50 and discharge projections 52 and 54 are formed as shown in the plan view of FIG. 3. The spacing of the discharge gap 50 is in the order of 6 μm. The discharge projections 52 and 54 are positioned substantially at the center of the edges of the disconnected portion of the gate lines 46. The height of the discharge projections 52 and 54 from the edges and the width thereof are both about 6 μm. Although the shape of the discharge projections 52 and 54 are rectangular in this embodiment, they may also be triangular or circular.

Though it may be more desirable for the spacing of the discharge gap 50 becomes shorter, sufficient discharge is obtained even if it is in the order of 4 to 10 μm because of limitations in the positioning precision of the exposure apparatus in the manufacturing process. Preferably, the discharge projections 52 and 54 are positioned at the center of the gate line edges if possible. This is to prevent discharge to the different adjacent gate line from occurring if the discharge projections as the wiring spacing (pitch) of the gate wires becomes narrower as the display density of the liquid crystal display becomes higher.

To determine the position of the discharge gap 50, ease of discharge should be considered, but it is only needed to determine the position of the discharge gap so that the areas of the disconnected gate lines 46 are substantially equal. However, the possibility of that position giving equal areas is in the pixel area is high, and it is desirable to provide discharge gap 50 in the area between the pixel area and the OLB electrode 40 (for instance, the lead area). In this embodiment, the discharge gap 50 is formed between the OLB electrode portion 40 and the pixel area, at a position spaced apart by about 0.5 mm from the pixel area.

Thus, in accordance with the present invention, simultaneously with the wiring for the gate wires in the array step, a discharge gap is formed as a countermeasure against static failure in the process prior to the formation of the short ring.

Figure 6:
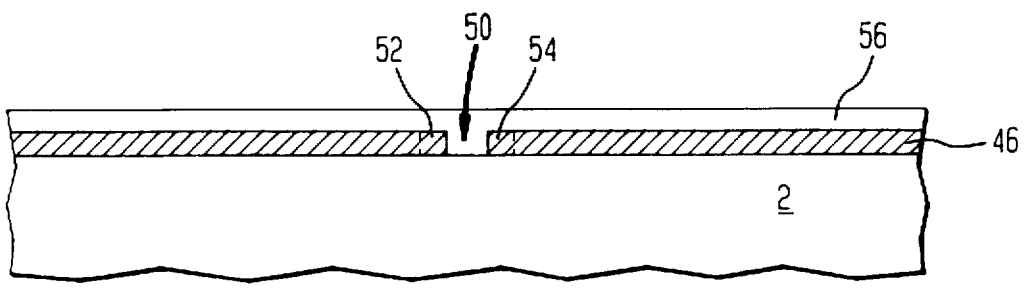
FIG. 6 shows a third step in the method for manufacturing a liquid crystal display according to the embodiment of the present invention.

Then a gate insulation film 56 is deposited by a CVD process, on the whole surface to a thickness of about 0.4 μm. At this point, as shown in FIG. 6, the discharge gap 50 is filled in with the material, such as silicon dioxide, for forming the gate insulation film 56.

Thereafter, after steps for forming a TFT by depositing a silicon nitride film and amorphous silicon, the gate insulation film 56 is patterned by making two through holes 58 in the vicinity of the discharge projections 52 and 54 of each gate line 46. Then, a metal wiring layer, about 0.3 μm thick, for forming data lines is formed over the whole surface. The through holes 58 are filled in with the deposited metal wiring layer. For this purpose, a metal material equivalent to the gate wiring material including Al can be used.

Figure 7:
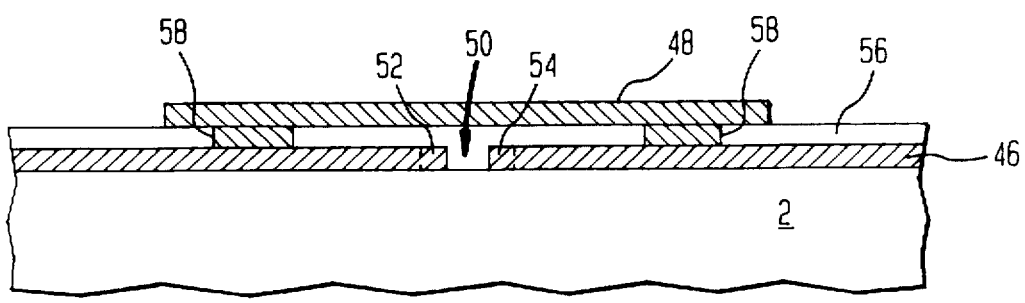
FIG. 7 shows a fourth step in the method for manufacturing a liquid crystal display according to the embodiment of the present invention.
Figure 8:
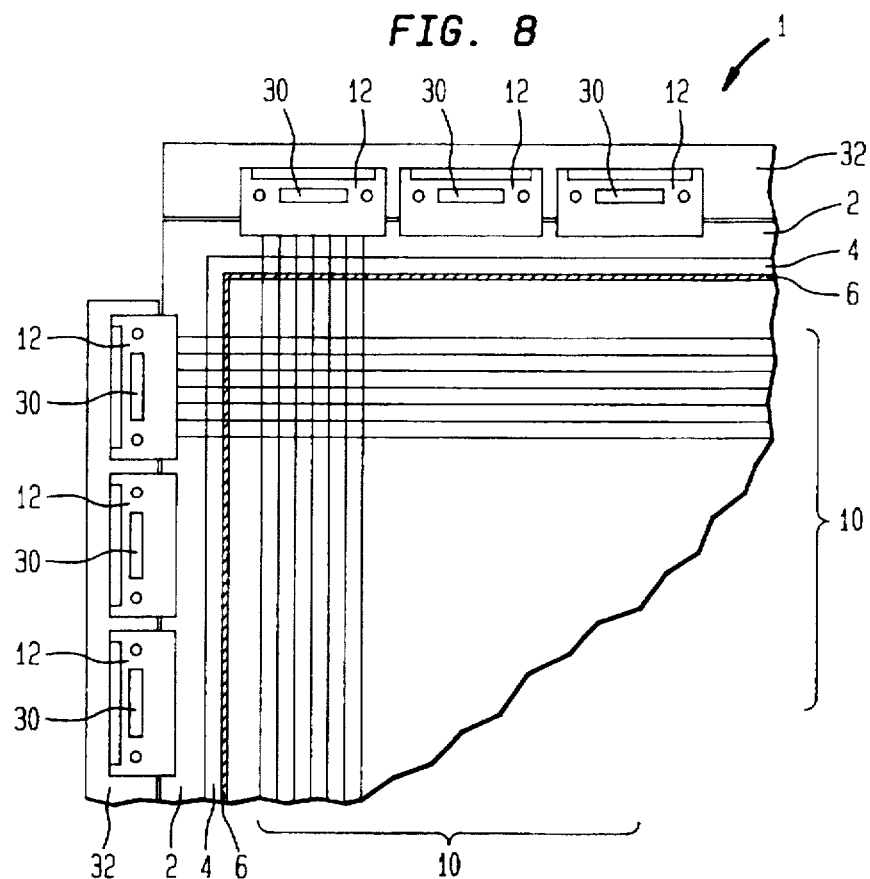
FIG. 8 shows the wiring structure of a liquid crystal display.
Figure 9:
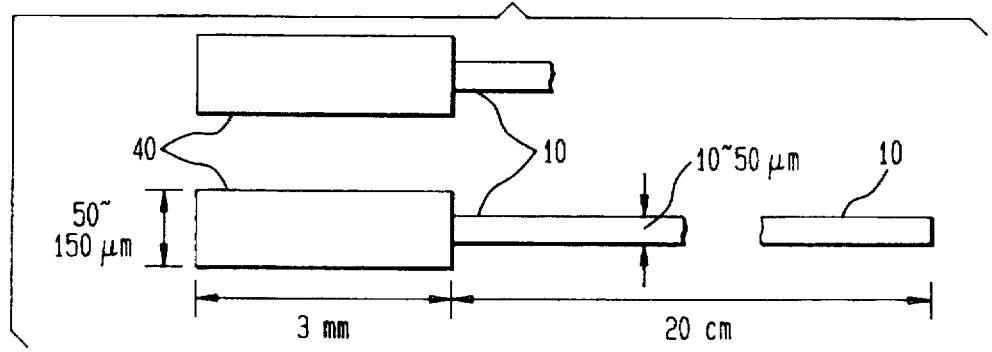
FIG. 9 shows details of the wiring structure of a liquid crystal display.
Figure 10:
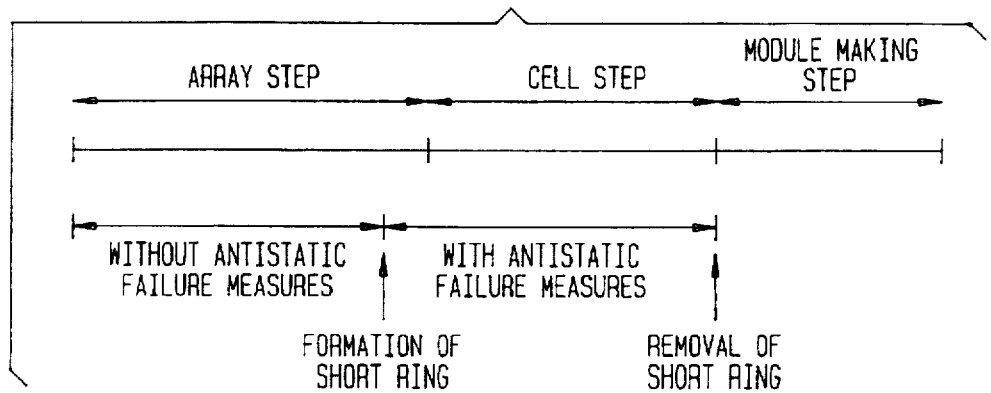
FIG. 10 is a figure used for explaining the antistatic failure measures using a short ring in the manufacturing process of a liquid crystal display.

When, the metal wiring layer for forming data lines is patterned for data lines, it is, as shown in FIG. 7, patterned to form a gate line connecting layer 48. Layer 48 electrically connects the disconnected gate lines 46 through the through holes 58 on both sides of the discharge gap 50 for the gate lines 46. Also, at the same time, the OLB electrodes 40 to be connected to the gate line edges are formed of the data line wiring metal. The formed OLB electrodes 40 are about 50 μm wide and about 3 mm long.

With the formation of the connecting layer 48, the disconnected gate lines are electrically connected to each other and lose their function as a means for preventing static failure. However, antistatic failure measures are then handled by forming a conventional short ring when the data lines are formed.

Therefore in accordance with the present invention, the gate lines are formed with gaps of predetermined length and width, so that the discharge of the charged gate lines occurs in the disconnected section. After the insulation film is grown, the static electricity building up in the gate lines is discharged in the disconnected section to break the insulation film in that section. However, the discharge has no effect in the pixels area so that the occurrence of pixel failure can be prevented. By connecting the gate lines on both sides of the gap with the metal of the data line layer, the original gate line is restored and the antistatic effect of the gap is lost. However, at this point, a circuit for removing static electricity (short ring) can be simultaneously formed, and the antistatic function is transferred to this short ring.

Accordingly, preventive measures against static failure can be provided throughout the array and cell steps of the manufacturing process of a liquid crystal display. With the method for manufacturing a liquid crystal display of the present invention, there is no need to increase the manufacturing process steps; only the modification of a mask used for patterning is needed to provide antistatic failure measures in the conventional manufacturing process.

The above embodiment of the present invention can be modified without departing from the spirit and scope of the invention. For example, although, in the above embodiment, the gate line connecting layer 48 was formed simultaneously with the formation of the data lines using the metal material for forming the data lines, other metal material can of course be used if increase in the manufacturing process steps is not a matter of concern.

Further, since the present invention is characterized in that the lower metal layer (namely, the metal layer formed at the early stage of the manufacturing process) is provided as antistatic failure means to prevent static failure from the early stage of the process, it is to be understood that the present invention can apply not only to a liquid crystal display of the so-called bottom gate type (or inverse-stagger type) TFT structure as described in the above embodiment, in which gate lines are formed prior to the formation of data lines, that is, the gate lines are positioned below the data lines, but also to a liquid crystal display of the so-called top gate type (or stagger type) TFT structure.

DESCRIPTION OF SYMBOLS

2 . . . Array substrate
4 . . . Color filter substrate
6 . . . sealing agent
10 . . . Data lines/gate lines
12 . . . TCP
24 . . . Display electrode
26 . . . TFT
30 . . . Driver ICs
32 . . . Printed wiring board 40 ... OLB electrode portions
42 ... Metal film
46 ... Gate lines
48 ... Al metal wiring layer
50 ... Discharge gap
52, 54 ... Discharge projections
56 ... Gate insulation film
58 ... Through holes

We claim:

1. An active matrix liquid crystal display in which switching elements are formed on a substrate in a pixel area of the liquid crystal display, said liquid crystal display comprising:

a set of first metal wires formed on said substrate with static electricity discharge means in the form of an area electrical disconnection therein to protect against downage due to electrical discharge occurring during a portion of the manufacturing process of the liquid crystal display;

an insulation layer formed on said first metal wires so as to fill in said area of electrical disconnection, and having through holes formed in said insulating layer to said first metal wires on both sides of said area; and a set of second metal wires formed on said insulation layer so as to fill in said through holes, said second metal wires being electrically connected to said first metal wires to bridge the area of electrical disconnection.

2. A liquid crystal display as set forth in claim 1 including a different means to protect against damage due to electrical discharge during other portions of the manufacturing cycle of the liquid crystal display following said portion of the manufacturing process.

3. A method for manufacturing an active matrix liquid crystal display in which switching elements are formed in a pixel area of said display, said method comprising:

forming on a substrate only which said switching elements are to be formed a set of first metal wires each with an area of electrical disconnection therein outside said pixel area to protect against the buildup of electrical charge during a portion of the manufacturing process of the liquid crystal display;

having the edges of the wires of said set of first metal wires facing each other in said area of electrical disconnection shaped into a projection so as to facilitate discharge due to the buildup of static electricity;

forming an insulation layer filling in said area of electrical disconnection of said first metal wires;

forming through holes in said insulation layer to said first metal wires at both sides of said area of electrical disconnection; and forming after said portion of the manufacturing process a second set of metal wires on said insulation layer that are electrically connected to said first metal wires through said through holes.

4. A method for manufacturing a liquid crystal display as set forth in claim 3 wherein said first metal wires are connected to the gate electrodes of said switching elements.

5. A method for manufacturing a liquid crystal display as set forth in claim 4 wherein said second metal wires are formed using the material for forming signal input side electrodes of said switching elements and simultaneously with the formation of said signal input side electrodes.

6. A method for manufacturing a liquid crystal display as set forth in claim 4 wherein said first metal wires are connected to signal input side electrodes of said switching elements.

7. A method for manufacturing a liquid crystal display as set forth in claim 6 wherein said second metal wires are formed using the material for forming gate electrodes of said switching elements and simultaneously with the formation of said gate electrodes.

8. A method for manufacturing an active matrix liquid crystal display in which switching elements are formed in a pixel area of said display, said method comprising:

forming on a substrate on which said switching elements are to be formed a set of first metal gate wires each with an area of electrical disconnection therein to protect against the buildup of electrical charge during an early portion of the manufacturing process of the liquid crystal display;

forming an insulation layer filling in said area of electrical disconnection in said first metal wires;

forming with the formation of data lines a short ring connecting all data lines and gate lines together;

forming through holes in said insulation layer to said first metal wires at both sides of said area; and forming after said formation of said short ring a second set of metal wires on said insulation layer that are electrically connected to said first metal wires through said through holes to shunt the areas of disconnection once the short ring is in place to protect against the buildup of elective charge.

9. A method for manufacturing a liquid crystal display as set forth in claim 8 including shaping the edges of said first metal wires facing each other in said area of electrical disconnection into a projection so as to facilitate the discharge due the buildup of static electricity.

10. A method for manufacturing a liquid crystal display as set forth in claim 8 including forming said second metal wires using the material for forming signal input side electrodes of said switching elements and simultaneously with the formation of said signal input side electrodes.

11. A method for manufacturing a liquid crystal display as set forth in claim 10 including forming said second metal wires using the material for forming gate electrodes of said switching elements and simultaneously with the formation of said gate electrodes.

* * * * *